United States Patent Office 2,693,491
Patented Nov. 2, 1954

2,693,491

DIAMINE REACTION PRODUCTS OF CYCLO-ALKANONES AND AMMONIA

William W. Prichard and Winston J. Wayne, Wilmington, Del., assignors to E. I. du Pont de Nemours and Company, Wilmington, Del., a corporation of Delaware No Drawing. Application September 30, 1953, Serial No. 383,396

3 Claims. (Cl. 260—563)

This invention relates to new cyclic ketone-ammonia reaction products and to methods for their preparation. More particularly this invention relates to new diamines and to their preparation.

It is known [Compt. rend. 169, 239 (1919)] that cyclohexanoneimine and an unidentified liquid, B. P. 183° to 184° C./3 mm. are obtained by reacting cyclohexanone with ammonia at 300°–330° C. over a dehydration catalyst.

It is an object of this invention to provide new chemical products and methods for their preparation. A further object is to provide new cyclic ketone-ammonia reaction products and methods for their preparation. A still further object is to provide new cyclic diamines and methods for their preparation. Another object is to provide new cyclic diamines having effective fungicidal and insecticidal properties. Other objects will appear hereinafter.

These and other objects of this invention are accomplished by providing new diamines which are the products obtained by reacting, under pressure at a temperature below 150° C., ammonia with a cycloalkanone containing at least one methylene group alpha to the carbonyl group, and subjecting the resulting reaction products to distillation over solid caustic alkali. These new diamines conform to the general formula $C_{3(n+1)}H_{3(2n)}N_2$, wherein $n$ is a whole number corresponding to one less carbon atom than the total number of carbon atoms in the cycloalkanone. These new diamines possess fungicidal and insecticidal properties and are therefore valuable compositions of matter.

In preparing the new amines of this invention batchwise, a pressure reactor is charged with a weighed amount of a cycloalkanone and, if desired, or needed, an inert solvent. The reactor is swept with oxygen-free nitrogen and then evacuated. Ammonia is added and the mixture held at a temperature below 150° C. under 100–20,000 lb./sq. in. pressure for a period of time up to 24 hours. The reactor is then opened, the contents discharged, separated from water, and distilled over solid caustic alkali at reduced pressure to recover the desired amine from unreacted starting materials and by-products.

The examples which follow are submitted to illustrate and not to limit this invention.

EXAMPLE I

Cyclohexanone (300 g., 33.06 moles) was loaded under nitrogen into a 1-liter stainless-steel rocker bomb. The bomb was pressure-tested with nitrogen and then cooled with Dry Ice. Liquid ammonia (180 g., 10.6 moles) was next passed into the bomb. Reaction was allowed to proceed with agitation at 125° C. under autogenous pressure (580–560 lb./sq. in.) for 15 hours. The bomb was then cooled to room temperature, the pressure released and the contents removed. The reaction mixture, consisting of an oil layer and a smaller water layer, was mixed and divided into two equal portions. To one portion which had been cooled was added sufficient solid potassium hydroxide to saturate the water layer, and the mixture was then extracted with ether. The ether extract was dried over solid potassium hydroxide (about 125 g.). The potassium hydroxide was then filtered off, fresh solid potassium hydroxide (about 75 g.) was added and the ether removed by distillation. The remaining oil was transferred to a still-pot, crushed solid potassium hydroxide (about 25 g.) added, and the oil distilled through a 24″ spinning-band column. The following products were obtained.

(1) Thin, clear, yellow liquid, 13.5 g., B. P. 45–147° C./0.5 mm., $n_D^{25}$ 1.4668–1.5265.

(2) A viscous, light yellow liquid, 74 g. (53% conversion of ketone), B. P. 147–150° C./0.5 mm., $n_D^{25}$ 1.5320–1.5337, corresponding in molecular formula to $C_{18}H_{30}N_2$.

Anal.—Calc'd for $C_{18}H_{30}N_2$: C, 78.8; H, 11.01; N, 10.2; N. E., 137. Found: C, 78.8; H, 11.18; N, 9.87; N. E., 136.

The $C_{18}H_{30}N_2$ diamine was insoluble in water, but soluble in dilute hydrochloric acid and ether. Its infrared absorption spectrum showed a strong absorption band at 6.00μ and a weak absorption band at 3.03μ.

The $C_{18}H_{30}N_2$ diamine was stable to distillation in the absence of solid alkaline hydroxide once it had been separated from impurities. A sample of the compound (22 g.) was redistilled in the absence of solid potassium hydroxide to yield a viscous, clear, almost colorless liquid, 20 g., B. P. 136–140° C./0.1 mm., $n_D^{25}$ 1.5325–1.5342.

The $C_{18}H_{30}N_2$ diamine (2 g.) when dissolved in dry ether (95 cc.) and treated with anhydrous hydrogen chloride formed a white solid. This solid, after being washed with ether and stored in a vacuum desiccator over anhydrous calcium chloride, slowly changed to a tan resinous material.

When the $C_{18}H_{30}N_2$ compound was heated in boiling water it decomposed to a compound corresponding to the molecular formula $C_{18}H_{27}N$. The $C_{18}H_{30}N_2$ compound (18 g.) was stirred in boiling oxygen-free water (250 cc.) for 3 hours, the reaction mixture extracted with ether, the ether extract dried, and, after removal of the drying agent and ether, the residue distilled. The following products were obtained.

(1) Thin, clear liquid, 2 g., B. P. 30–110° C./0.6 mm., $n_D^{25}$ 1.4543–1.5226.

(2) Viscous, yellow liquid, 6 g. (36% conversion of $C_{18}H_{30}N_2$ compound), B. P. 110–133° C./0.2 mm., $n_D^{25}$ 1.5509–1.5604.

Anal.—Calc'd for $C_{18}H_{27}N$ monobasic compound: C, 84.0; H, 10.57; N, 5.44; N. E., 257. Found: C, 84.23; H, 10.70; N, 6.21; N. E., 245.

(3) Brown, hard resin-like residue, 12 g. The original reaction water had a pH of 9.5 and smelled of ammonia.

The $C_{18}H_{30}N_2$ compound was also decomposed to a $C_{18}H_{27}N$ compound by refluxing its chloroform solution. A solution of the $C_{18}H_{30}N_2$ compound (65 g.) in chloroform (70 cc.) was refluxed for one hour. The refluxing solution foamed, indicating gas generation. The chloroform was distilled, accompanied by evolution of ammonia, and the residue then distilled to yield the following products.

(1) Thin, colorless liquid, 28.5 g., B. P. 81–96° C./2 mm., $n_D^{25}$ 1.5098–1.5138.

(2) Viscous yellow liquid, 24 g. (36% conversion of the $C_{18}H_{30}N_2$ compound), B. P. 142–148° C./0.4 mm., $n_D^{25}$ 1.5562–1.5648.

Anal.—Calc'd for $C_{18}H_{27}N$ monobasis compound: C, 84.0; H, 10.57; N, 5.44; N. E., 257. Found: C, 83.9; H, 10.55; N, 5.70; N. E., 253.

(3) Residue, 4 g.

The $C_{18}H_{30}N_2$ compound reacted readily with oxygen to form a peroxide. A solution of the $C_{18}H_{30}N_2$ compound (2 g.) in acetone (50 cc.) had oxygen bubbled through it (200 cc./minute) at 25° C. During 17 hours, 157 cc. of oxygen was absorbed (0.9 mole oxygen/mole compound). The crystalline white solid which precipitated weighed 1.54 g. after being filtered, washed with acetone, and air-dried. The solid gave a strong positive test for peroxide with potassium iodide in acetic acid solution. It softened at 108° C. and decomposed with vigorous gas evolution at 110° C.

Anal.—Calc'd for $C_{18}H_{30}O_2N_2$: C, 70.6; H, 9.88; N, 9.14; peroxide O, 10.4; N. E., 153. Found: C, 71.6; H, 9.86; N, 9.61; peroxide O, 7.50; N. E., 193.

The cyclohexanone-ammonia condensation at 135° C. with distillation of the reaction mixture over solid potassium hydroxide as described in this example was repeated with the following results:

(1) Thin, light yellow liquid, 31 g., B. P. 80–153° C./0.6 mm., $n_D^{25}$ 1.4543–1.5308.

(2) Viscous, light yellow liquid, 75 g. (52% conversion of ketone), B. P. 149°–153° C./0.6 mm., $n_D^{25}$ 1.5349–1.5369, corresponding in molecular formula to $C_{18}H_{30}N_2$.

*Anal.*—Calc'd for $C_{18}H_{30}N_2$: C, 78.8; H, 11.01; N, 10.2; N. E., 137. Found: C, 79.4; H, 11.19; N, 9.5; N. E., 165.

EXAMPLE II 4-methylcyclohexanone (300 g., 2.68 moles) was reacted with ammonia (180 g., 10.6 moles) at 125° C. under autogenous pressure for 15 hours, and the reaction mixture worked up and distilled over solid potassium hydroxide as described in Example I to yield the following:

(1) Thin, clear, slightly yellow liquid, 29.5 g., B. P. 47–51° C./10 mm., $n_D^{25}$ 1.4828.

(2) Clear, yellow liquid, 21.5 g., B. P. 116–131° C./1 mm., $n_D^{25}$ 1.4981–1.5059.

(3) A viscous, clear, slightly yellow liquid 155 g. (55% conversion of the ketone), B. P. 131–172° C./0.7 mm., $n_D^{25}$ 1.5108–1.5160, corresponding in molecular formula to $C_{21}H_{36}N_2$. This product was purified by redistillation from solid potassium hydroxide to yield 135 g. of a product boiling at 148–155° C./0.5 mm., $n_D^{25}$ 1.5151–1.5160.

*Anal.*—Calc'd for $C_{21}H_{36}N_2$: C, 79.7; H, 11.46; N, 8.86; N. E., 158. Found: C, 80.5; H, 11.78; N, 8.98; N. E., 162.

The infrared spectrum of the $C_{21}H_{36}N_2$ compound showed a strong absorption band at $6.02\mu$ and a weak absorption band at $3.04\mu$.

EXAMPLE III 3-methylcyclohexanone (300 g., 2.68 moles) was reacted with ammonia (180 g., 10.6 moles) at 125° C. under autogenous pressure for 14.5 hours, and the reaction mixture worked up and distilled over solid potassum hydroxide as described in Example I to yield the following:

(1) Thin, yellow clear liquid, 37 g., B. P. 25°–58° C./1.5 mm., $n_D^{25}$ 1.4772.

(2) Thin, clear yellow liquid, 37 g., B. P. 58–114° C./1.5 mm., $n_D^{25}$ 1.4868.

(3) A viscous clear, light yellow liquid, 98 g. (35% conversion of the ketone), B. P. 114–150° C./0.7 mm., $n_D^{25}$ 1.5066–1.5150, corresponding in molecular formula to $C_{21}H_{36}N_2$. This product was purified by redistillation from solid KOH to yield 60 g. of compound boiling at 145–152° C./0.6 mm., $n_D^{25}$ 1.5168–1.5170.

*Anal.*—Calc'd for $C_{21}H_{36}N_2$: C, 79.7; H, 11.46; N, 8.86; N. E., 158. Found: C, 80.6; H, 12.02; N, 8.81; N. E., 177.

The infrared spectrum of the $C_{12}H_{36}N_2$ compound showed a strong absorption band at $6.02\mu$ and a weak absorption band at $3.05\mu$.

EXAMPLE IV

Cyclopentanone (300 g., 3.57 moles) was reacted with ammonia (180 g., 10.6 moles) at 100° C. under autogenous pressure (460–520 lb./sq. in.) for 14.6 hours, and the reaction mixture worked up and distilled over solid potassium hydroxide as described in Example I to yield the following:

(1) Thin, yellow liquid, 48 g., B. P. 40–94° C./0.6 mm., $n_D^{25}$ 1.5380–1.5572.

(2) Thin, yellow liquid, 111 g., B. P., 109–136° C./0.4 mm., $n_D^{25}$ 1.5513–1.5464.

(3) Mixture of liquid and solid, 18 g., B. P. 136° C./0.4 mm., $n_D^{25}$ 1.5663–1.5092.

Product (2) was redistilled from solid potassium hydroxide to yield 67 g. of product (4) [below], B. P. 132–134° C./0.5 mm., $n_D^{25}$ 1.5439–1.5484.

(4) An approximate 1:1 molar mixture of a $C_{15}H_{24}N_2$ compound and $C_{15}H_{21}N$ compound.

*Anal.*—Calc'd for—
$C_{15}H_{24}N_2$: C, 77.5; H, 10.41; N, 12.05; N. E., 116.
$C_{15}H_{21}N$: C, 83.7; H, 9.83; N, 6.51; N. E., 215.
$C_{15}H_{24}N_2 \cdot C_{15}H_{21}N$: C, 80.5; H, 10.11; N, 9.39; N. E., 149.

Found for product (4): C, 81.1; H, 10.03; N, 9.16; N. E., 153.

The infrared spectrum of the $C_{15}H_{24}N_2 \cdot C_{15}H_{21}N$ mixture showed fairly strong absorption bands at $5.96$ and $6.11\mu$ and a weak absorption band at $3.09\mu$.

The cycloalkanones used in the process of this invention are those which contain from 5 to 7 carbon atoms in the ring, and which except for the carbonyl oxygen, are wholly hydrocarbon. These cycloalkanones may contain alkyl substituents on one but not on both carbons alpha to the carbonyl group, that is, they contain at least one methylene group alpha to the carbonyl group. The preferred cycloalkanones, because of their reactivity to give the desired products in good yield, are cyclohexanones and cyclopentanones in which the carbons adjacent to the carbonyl group are unsubstituted.

Pressure is an important variable in condensing the cycloalkanone with ammonia. A convenient way for attaining the required pressure conditions is by operating in a closed system. If desired, however, pressures from external sources may be applied. Pressures up to the maximum permitted by the equipment may be employed but as a practical matter 20,000 lb./sq. in. represents the useful upper limit. As a rule pressures in the range of 100–10,000 lb./sq. in. are used and this embraces the preferred operating conditions.

The particular temperature employed in making the cycloalkanone-ammonia condensation products is dependent to some extent upon the pressure conditions. As a rule temperatures below 150° C., especially 50–125° C., are used because under these conditions the reaction takes place at a practical rate under pressures which correspond to the combined vapor pressures of the reactants and the desired amine is less apt to be decomposed.

The time of reaction depends upon the conditions selected and method of operation. In general, the time is not less than one hour or more than 24 hours, in a batch operation. In a continuous operation with low conversions per pass and with recovery and re-cycling of un-reacted reactants, the time factor disappears as an important variable.

The exact structure of the compounds of this invention is not known but it is believed that they are polycyclic diamines with secondary and tertiary amino nitrogens as part of the cyclic structures.

The critical step in the preparation of the polycyclic secondary-tertiary amines of this invention is the distillation over solid caustic alkali. Solid potassium hydroxide has been used in the examples but alternative equivalents therefor are solid sodium and lithium hydroxides. In large scale operation, sodium hydroxide has advantages over lithium and potassium hydroxides in cost and it is the preferred alkali to employ. The caustic alkali can be of commercial grade and from practical considerations this is the grade generally used. The amount of caustic alkali employed in the distillation is not critical but generally an amount is used ranging from about 1% to about 25% by weight of the material being distilled. The distillation is generally conducted at reduced pressures, i. e., less than atmospheric pressure, in order to reduce the amount of by-product formation.

The examples which follow are submitted to illustrate the usefulness of the compounds of this invention as insecticides and fungicides.

*Example A*

The cyclic ketone/ammonia condensation products obtained in Examples I, II, and III were tested as protective fungicides against tomato early blight, tomato late blight and bean rust. Water dispersions of the compounds were prepared by mixing formulations of 1 part of the ketone-ammonia condensation test compound with 0.1 part of surface-active agent and 25 parts of acetone in sufficient water to give the desired concentration. Tomato or bean plants were sprayed with the dispersion of selected concentration, air-dried, and then inoculated with the test fungus by spraying with a suspension of its spores. The plants were then stored in a humidity chamber overnight and then placed in the greenhouse until unprotected, inoculated control plants developed sufficient disease for measurement. Bean rust and tomato early blight lesions were counted and severity of wilting with tomato late blight was noted. Results were expressed as percent disease (percent lesions or percent wilting based on the number of lesions or extent of wilting of the unprotected inoculated controls) at given concentrations of compound spray. The results obtained are summarized below:

| Cyclic Ketone | Ammonia Condensation product | Spray Conc., Percent | Percent Disease | | |
|---|---|---|---|---|---|
| | | | Tomato early Blight | Tomato Late Blight | Bean Rust |
| Cyclohexanone | $C_{18}H_{30}N_2$ | 0.2 | 7 | 0 | 3 |
| | | 0.04 | 15 | 17 | 44 |
| 4-Methylcyclohexanone | $C_{21}H_{36}N_2$ | 0.2 | 3 | 1 | 0 |
| | | 0.04 | 42 | 53 | 4 |
| 3-Methylcyclohexanone | $C_{21}H_{36}N_2$ | 0.2 | 1 | 3 | 0 |
| | | 0.04 | 59 | 40 | 1 |

It is evident that all three cyclic ketone/ammonia condensation products afforded fungistatic protection against tomato early blight, tomato late blight and bean rust.

*Example B*

The cyclic ketone/ammonia condensation products obtained in Examples I, II, and III showed activity as ovicides against eggs of the two-spotted mite. The compounds sprayed on the eggs as a 2% solution in acetone gave the following results:

| Cyclic Ketone | Ammonia Cond. Product | Percent Kill |
|---|---|---|
| Cyclohexanone | $C_{18}H_{30}N_2$ | 95 |
| 4-Methylcyclohexanone | $C_{21}H_{36}N_2$ | 80 |
| 3-Methylcyclohexanone | $C_{21}H_{36}N_2$ | 90 |

*Example C*

The $C_{18}H_{30}N_2$ compound obtained from cyclohexanone and ammonia in Example I showed activity as an insecticide against bean aphid and two-spotted mite. The following results were obtained when the compound was sprayed as a 2% solution in acetone.

| Insect: | Percent kill |
|---|---|
| Bean aphid | 90 |
| Two-spotted mite | 70 |

In addition to the uses illustrated above as fungicides and insecticides, the compounds of this invention find utility as anti-oxidants, oxygen scavengers and low cost chemical intermediates for the synthesis of hexahydropyrimidines, and amino alcohols.

As many apparently widely different embodiments of this invention may be made without departing from the spirit and scope thereof, it is to be understood that this invention is not limited to the specific embodiments thereof except as defined in the appended claims.

We claim:

1. A diamine which is the product obtained by reacting, under pressure at a temperature below 150° C., ammonia with a compound selected from the class consisting of unsubstituted cycloalkanones containing from 5 to 7 carbon atoms in the ring and mono-substituted cycloalkanones containing from 5 to 7 carbon atoms in the ring where said mono-substituent is a lower alkyl group, and subjecting the resulting reaction products to distillation over solid caustic alkali, said diamine having the general formula $C_{3(n+1)}H_{3(2n)}N_2$ wherein $n$ is a whole number corresponding to one less carbon atom than the total number of carbon atoms in said cycloalkanone.

2. A diamine which is the product obtained by reacting, under pressure at a temperature below 150° C., ammonia with cyclohexanone and subjecting the resulting reaction products to distillation over solid caustic alkali, said diamine having the formula $C_{18}H_{30}N_2$.

3. A diamine which is the product obtained by reacting, under pressure at a temperature below 150° C., ammonia with methylcyclohexanone and subjecting the resulting reaction products to distillation over solid caustic alkali, said diamine having the formula $C_{21}H_{36}N_2$.

No references cited.